United States Patent [19]

Dornberger

[11] 4,102,117
[45] Jul. 25, 1978

[54] WIRE TWISTING METHOD AND APPARATUS

[75] Inventor: Georg Christian Ernst Dornberger, Phoenix, Ariz.

[73] Assignee: Western Electric Company, Inc., New York, N.Y.

[21] Appl. No.: 699,821

[22] Filed: Jun. 25, 1976

[51] Int. Cl.² ............................................. H01B 13/00
[52] U.S. Cl. ......................................... 57/93; 57/12; 57/59; 57/160
[58] Field of Search ................... 57/34 R, 93, 94, 3, 57/6, 12, 160, 59

[56] References Cited

U.S. PATENT DOCUMENTS

| | | | |
|---|---|---|---|
| 2,869,316 | 1/1959 | Lilly | 57/93 |
| 2,956,102 | 10/1960 | Lilly | 57/93 X |
| 3,017,450 | 1/1962 | Crosby et al. | 57/93 X |
| 3,140,577 | 7/1964 | Ash | 57/93 X |
| 3,377,791 | 4/1968 | Lemaire | 57/94 X |
| 3,408,807 | 11/1968 | Sylthe | 57/12 X |
| 3,526,244 | 9/1970 | Joy | 57/93 X |
| 3,538,697 | 11/1970 | Hornor et al. | 57/6 |
| 3,732,682 | 5/1973 | Crotty et al. | 57/160 X |
| 3,882,907 | 5/1975 | Degen | 57/93 X |
| 3,946,215 | 3/1976 | May | 235/152 |

Primary Examiner—Donald Watkins
Attorney, Agent, or Firm—K. R. Bergum; R. P. Miller

[57] ABSTRACT

A twisted pair of wires is produced by drawing two insulated wires from two supply reels while rotating one wire supply reel about the other. A capstan and tachometer measure the linear rate at which the twisted pair is being drawn. The output of the tachometer is controllably and variably divided and used to control a power inverter that drives a motor which rotates the one wire supply reel about the other. The variable ratio between the linear wire movement and the rotary or twisting movement is controlled by a random generator producing a series of numbers representing length per twist of the twisted pair, between fixed limits.

10 Claims, 2 Drawing Figures

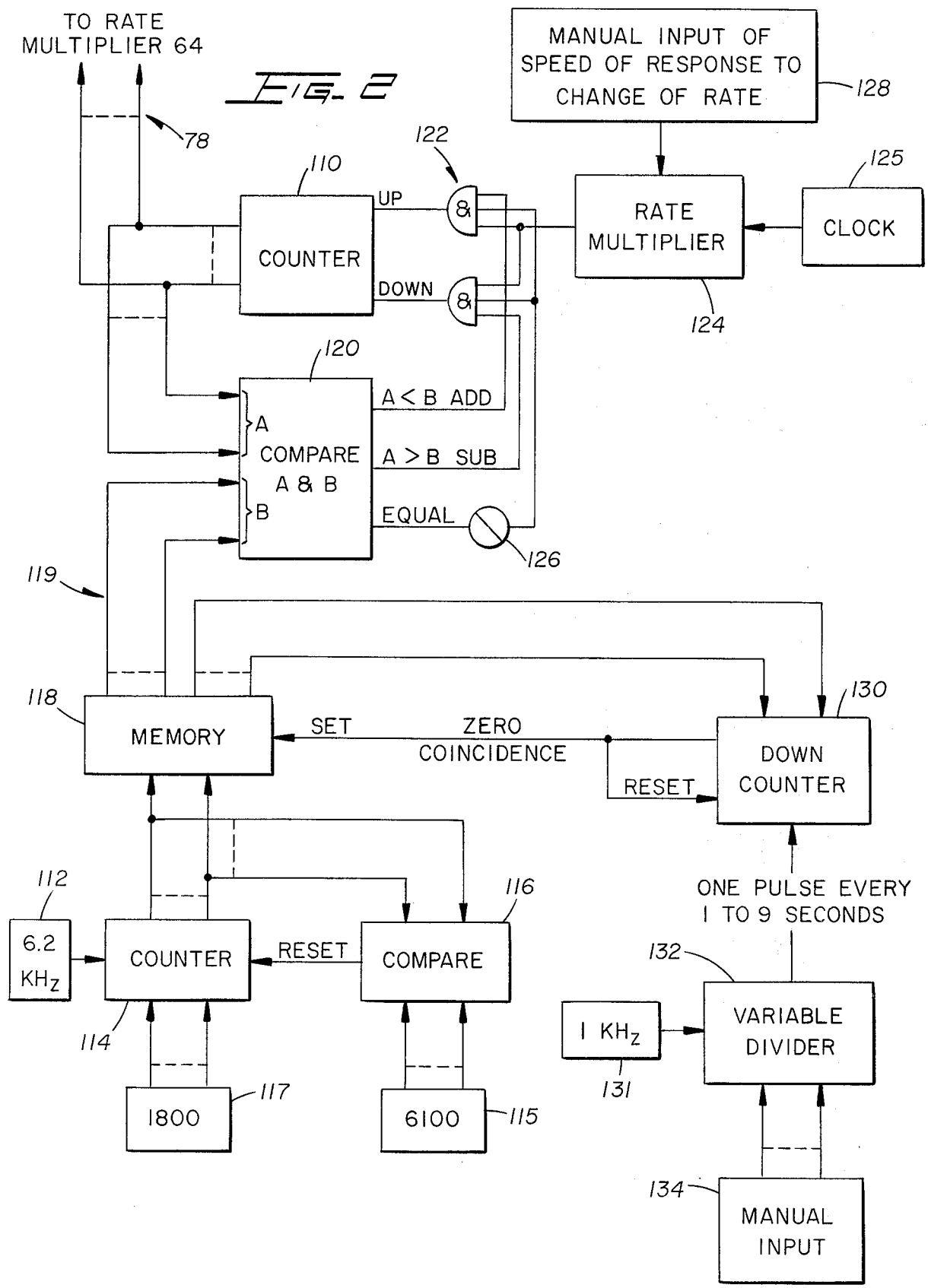

WIRE TWISTING METHOD AND APPARATUS

FIELD OF THE INVENTION

The present invention relates to twisting pairs of wires and more particularly to controlling the speed of twist from the speed at which the twisted pair is drawn through the twisting apparatus.

BACKGROUND OF THE INVENTION

In the manufacture of communication cables, each communications channel is usually associated with a pair of wires that are twisted one about the other to provide a degree of shielding so as to minimize reception and emission of spurious signals by electronic or magnetic radiation. Hundreds or thousands of these twisted pairs are often combined in a single cable that can be hung from poles, pulled through conduit buried in the ground, or can be buried directly in the ground. With so many twisted pairs in close proximity within a single cable, steps must be taken to prevent crosstalk between one twisted pair and another. Such crosstalk within the cable is minimized by having the twisted pairs of many different twist lengths, typically varying from 1.8 inches per twist to 6.1 inches per twist in increments of 1/10 inch. With many different twist lengths within a cable, radiations from one twisted pair are cancelled at various points on another twisted pair due to the changing phase between the twisted lengths of any two pairs. Efforts must then be made when "laying up" a cable to keep twisted pairs of the same twist length reasonably remote from one another to minimize crosstalk resulting from long, parallel lengths of identical twist length. This requires extra care in the preparation and assembly of cable.

Twisting machines customarily provide direct gearing between the wire pulling mechanism and the twister carriage or flier which twists one wire about the other. These gears are readily changeable to vary the ratio between pulling and twisting so as to produce the wide range of twist lengths desired. These gear-driven machines can tend to be noisy, especially in large numbers.

DESCRIPTION OF THE PRIOR ART

U.S. Pat. No. 2,959,102, granted on Oct. 11, 1960, to J. C. Lilley, discloses a machine for twisting a pair of wires. A motor drives the twister carriage or flier and through a variable-speed drive pulls the pair from the flier. The speed ratio is constantly varied by a reversible gear system from the capstan. The reversing system is controlled at a more-or-less random rate to reverse the direction of speed ratio change. Therefore, the speed ratio between the flier or carriage rotation and wire pulling is varied from time to time in order to produce a twisted pair in which the twist length varies in a random fashion along the length of the twisted pair.

SUMMARY OF THE INVENTION

In accordance with the present invention the twist length of the pair of twisted wires is controlled by generating from the actual movement of the twisted pair a series of pulses representative of the linear travel of the twisted pair, electronically altering the frequency of the pulses generated and driving the twisting flier at a rotational speed representative of the altered frequency of the pulses.

In accordance with another aspect of the present invention, the alteration of the frequency of the generated pulses is increased or decreased by a ratio represented by a series of random numbers representative of twist lengths between fixed limits.

BRIEF DESCRIPTION OF THE DRAWINGS

A more complete understanding of the present invention may be had by referring to the following detailed description when considered in conjunction with the accompanying drawings wherein:

FIG. 2 is a system for generating a series of random numbers representative of random speed ratios for producing random variation in the length of twist of the twisted wire pair.

DETAILED DESCRIPTION

Figure 1:
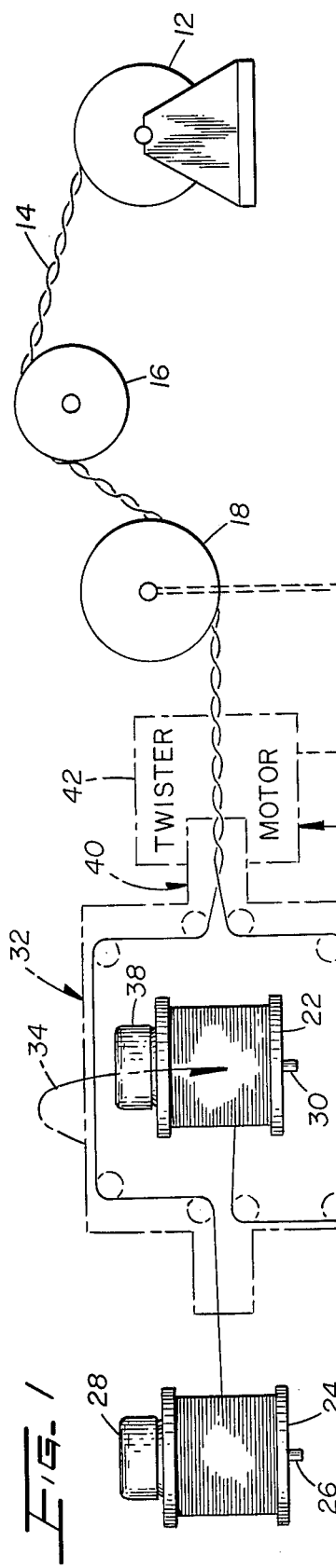
FIG. 1 is a schematic diagram of a twister with an electronic speed ratio control system according to the present invention.
Figure 1:
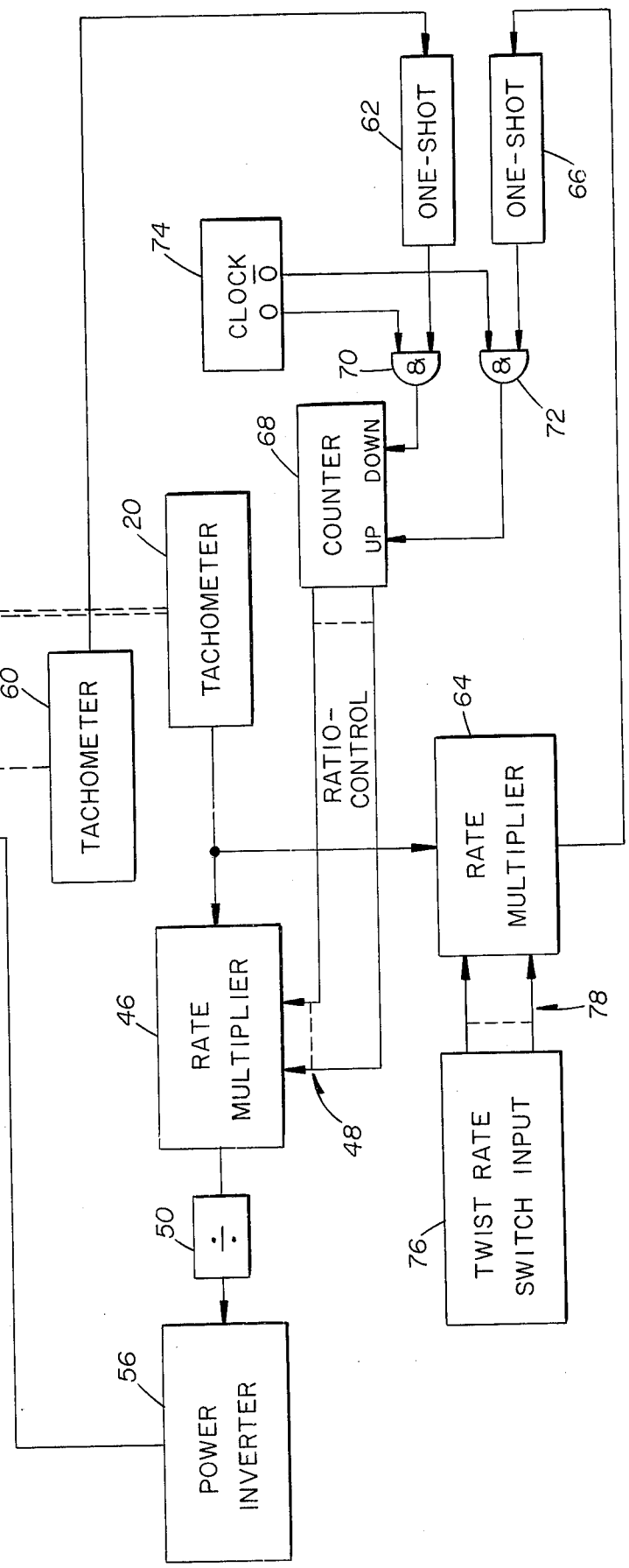

Referring now to the accompanying drawings and more particularly to FIG. 1, a take-up reel system 12, driven preferably by a torque motor or fluid clutch, winds a twisted wire pair 14 drawn by a constant-speed puller capstan 16 across a measuring capstan 18. The measuring capstan 18 is connected to a digital tachometer 20 that generates a pulse for each unit length of the twisted pair of wires 14 that is pulled around the measuring capstan 18. Preferably, the unit length is very small and a great many pulses are generated for each inch of the twisted pair of wires 14.

The source of wire for the twisted pair 14 comprises two supply reels 22 and 24 of copper or other wire with suitable insulation. The reel 24 is freely rotatable about a fixed axis 26. A drag device 28 is connected to the reel 24 and maintains tension on the wire being drawn therefrom. The drag device can be a prony brake, a hysteresis brake, a hydrodynamic brake, or any fixed or variable drag device capable of modestly impeding the free rotation of the reel 24, including an adjustable drag controlled by the diameter of the wire remaining on the reel 24. If the wire is drawn very rapidly from the reel 24, it may be desirable to use a torque motor as the drag device 28 and actually aid the wire tension in rotating the reel 24.

The reel 22 rotates freely about a rotating axis 30 that is part of a twister carriage or flier 32 that rotates in the direction of the arrow 34. A drag device 38 is attached to the reel 22 and functions the same as the drag device 28 on the reel 24. The wires issuing from the reels 22 and 24 follow a multiple pulley path and through a guide 40 to become the twisted pair 14. A twister motor 42 rotates the carriage 32 in the direction of the arrow 34 in accordance with the frequency of the AC power supplied to it. The twister carriage or flier 32 is more-or-less conventional in its general layout and any number of specific arrangements of the reels 22 and 24 will function satisfactorily with a variable-speed twister motor 42.

As the twisted pair 14 passes around the lightweight measuring capstan 18, the digital tachometer 20 generates output pulses at a frequency proportional to the speed of linear travel of the twisted pair. The output of the tachometer 20 is delivered to a rate multiplier 46 which is a binary-counting frequency-divider-type of circuit capable of producing pulses at an output frequency which is a numerical ratio or fraction, less-than-one, of its input frequency. The ratio of the rate multiplier 46 is controlled in real time, i.e., from instant-toinstant, by a multi-bit binary number present on a plurality of ratio-control conductors 48.

The output of the rate multiplier 46 is a series of pulses that are not at precisely regular intervals. Some typical rate multiplier circuits in an integrated-circuit format are RCA COS/MOS rate multipliers sold under the designations CD4527B and CD4089B. These circuits are explained in an RCA Solid State Division Digital Integrated Circuits Application Note ICAN-6739 by G. J. Summers' published on Page 629 of the 1975 edition of the RCA COS/MOS Integrated Circuits Databook, copyright 1974 by RCA Corporation. A rate multiplier obtains its frequency control over an averaging interval by deleting selected pulses of the pulse train delivered to it. Therefore, the pulse train emitted by a rate multiplier is an uneven string of pulses. For this reason, the frequency of pulses emitted by the tachometer 20 should be as high as possible so that the effect of instantaneous unevenness in the period or frequency of the pulses emitted by the rate multiplier 46 can be minimized using a common frequency divider 50.

The output of the rate multiplier 46 is delivered via the divider 50 to a power inverter 56, of conventional design, that develops a three-phase AC power signal at the frequency of the output pulses of the frequency divider 50. The AC power signal from the power inverter 56 is delivered to the twister motor 42 that drives the movable wire supply reel 22 on the flier 32 around with respect to the stationary wire supply reel 24 to accomplish the twisting of the two wires.

Since the twister motor 42 is an AC induction motor, its rotor does not rotate at exactly the synchronous speed corresponding to the frequency of the input signal from the power inverter 56, rather the twister motor 42 rotates at some speed slighty below the synchronous speed of the input frequency. The difference between the synchronous speed and the actual rotor speed is called the slip speed of the motor. The slip speed can vary with many factors, including load. Therefore, to have the rotor of the motor 42 rotating at exactly the desired rotational speed to correspond with the linear speed of travel of the wire over the capstan 18, a slip correction factor must be introduced into the frequency signal delivered to the power inverter 56. This slip correction factor is obtained by a slip control feedback system that adjusts the ratio of the rate multiplier 46.

The rotor of the motor 42 is connected to a tachometer 60, the output of which is delivered to a monostable-multivibrator or one-shot 62. The one-shot 62 develops a pulse of predetermined width or duration for each output pulse of the tachometer 60 and thus for each revolution (or fraction thereof) of the twister motor 42. Consequently, the frequency of these pulses issued by the one-shot 62 is a direct function of the speed of the rotor of the motor 42. In order to provide a speed standard for comparison with the output frequency of the tachometer 60, the output of the tachometer 20 is delivered through a frequency-standard rate multiplier 64 to another one-shot 66.

Assuming unity multiplication in the frequencystandard rate multiplier 64, the one-shot 66 issues a pulse of a predetermined width or duration for every pulse from the tachometer 20. Consequently, the output of the one-shot 66 has a frequency that is directly proportional to the speed of rotation of the capstan 18 and the speed at which the wire pair 14 is drawn from the flier 32. The outputs of the one-shots 62 and 66 could be used directy to drive an updown binary counter 68, the output of which is used to control the ratio of the rate multiplier 46.

Every time that an output pulse is issued by the one-shot 66, it indicates that the capstan 18 is going fast, and therefore, increases the count in the counter 68 in order to increase the speed of the twister motor 42. Each output pulse from the one-shot 62 indicates that the twister motor 42 is going fast and is used to reduce the count in the updown counter 68 so as to reduce the speed of the twister motor 42. It can then be seen that if pulses are ultimately developed from the capstan 18 at the same rate as pulses are being developed from the rotor of the twister motor 42, the up-down counter 68 does not change substantially and the twister motor 42 goes at a constant speed.

However, if pulses are received from the one-shot 66 faster than pulses are received from the one-shot 62, the count in the up-down counter 68 increases, thereby increasing the multiplication factor of the rate multiplier 46. Increasing the multiplication factor of the rate multiplier 46 increases the speed of the twister motor 42 until the frequency of the pulses issuing from the one-shot 66 is equaled by the frequency of pulses from the one-shot 62. The opposite happens if the twister is going too fast and more pulses are issued by the one-shot 62 than are issued by the one-shot 66.

One problem with this arrangement is that pulses can be issued simultaneously by the one-shots 62 and 66 with possible confusion of the up-down counter 68. Therefore, the one-shots 62 and 66 deliver their outputs to a pair of AND-gates 70 and 72. The normal and inverted outputs of a clock 74 are then used to send pulses through the AND-gates 70 or 72 whenever the associated outputs from the clock 74 occur at the same time that their associated one-shots 62 or 66 are issuing pulses. The trigger pulses thus delivered by the normal output of the clock 74 to the AND-gate 70 are, therefore, 180° out of phase with the trigger pulses delivered by the inverted output of the clock 74 to the AND-gate 72. Consequently, conflicting signals can never be sent to the updown counter 68.

The pulses from the one-shots 62 and 66 are substantially longer than the clock cycle interval. Therefore, each pulse from a one-shot 62 or 66 causes its associated AND-gate 70 or 72 to pass several trigger pulses to the corresponding input of the up-down counter 68. Consequently, the duration of the pulses from the one-shots 62 and 66 must be identical. Using the gates 70 and 72 and the clock 74, the response of the system shown in FIG. 1 is essentially the same as the operation previously described without the AND-gates 70 and 72 and the clock 74.

The rate multiplier 64 had previously been assumed to have no effect on the pulses issued by the tachometer 20. However, twist lengths vary from about 1.8 inches per twist to 6.1 or more inches per twist. Therefore, it is necessary to maintain different ratios between the speed of rotation of the twister motor 42 and the linear speed of the twisted pair of wires passing over the capstan 18. While the diameter of the capstan 18 can be changed to vary these ratios, that is an expensive nuisance in a factory where it is possible that each successive pair of wires may be twisted at a different twist length for inclusion in a given cable. Also, changing the diameter of the capstan 18 to change twist length does not so easily facilitate producing twisted pairs of randomly-varying twist length.

In order to make it much easier to vary the twist length, a manual, thumb-wheel switch input signal generator 76 delivers a binary coded twist length signal on a plurality of conductors 78 to the rate multiplier 64. The signal on conductors 78 causes the rate multiplier 64 to diminish the frequency of pulses delivered from the tachometer 20 to the one-shot 66, in accordance with the twist length desired. Other than changing this ratio, the rate multiplier 64 has no other effect on the operation of the system. The lesser numbers of pulses delivered by the one-shot 66 must be matched by a lesser number of pulses issued by the one-shot 62. Therefore, the pulses from the AND-gates 70 and 72 compete until the condition of the up-down counter 68 controls the rate multiplier 46 to cause the twister motor 42 to rotate at a speed dictated by the signal generated by the switch input 76.

In the schematic twister control system shown in FIG. 1, the twist rate is controlled by the switch input 76 that provides the divisor input or ratio for the rate multiplier 64. When twisting cables with a random twist, the manual switch divisor from the switch input 76 is replaced by a varying divisor which varies at some random rate between random numbers representative of twist lengths that vary between 1.8 inches and 6.1 inches per twist.

Referring now to FIG. 2, the divisor input to the rate multiplier 64 is provided on the conductors 78 by an up-down binary conter 110, which is increased or decreased to alter the twist rate.

The counter 110 is controlled from a randomizing circuit comprising a 6.2 KHz oscillator 112, the output of which is counted in a counter 114. The counter 114 counts between 1800 and 6100 on a binary-coded decimal (BCD) basis. The numbers 1800 and 6100 relate to the limits of the twist length. In order to permit shorter twist lengths, the counter 114 is set to start counting at a number less than 1800. In order to permit longer twist lengths the counter 114 is set to stop counting at a number higher than 6100. However, assuming a lower limit of 1800 (1.8 inches per twist) and an upper limit of 6100 (6.1 inches per twist), the output of the counter 114 is monitored by a comparator 116. The standard for the comparator 116 is derived from a BCD 6100 signal source 115. Each time the counter 114 reaches a count of 6100, the comparator 116 recognizes this and resets the counter 114. A source 117 of the code for 1800 in BCD primes the reset of the counter 114. Therefore, whenever the counter 114 is reset, it is set to a count of 1800 from which it begins counting at 6.2 KHz to 6100.

The output of the counter 114 is delivered to a memory 118. When the memory 118 receives a set signal, it stores whatever count is then registered in the counter 114. The contents of the memory 118 are always a four-decimal-digit number in the BCD system, the first or most significant two decimal digits of which are always from 18 to 61, inclusive. The first two and most significant two digits are delivered on a most significant bus 119 to the B input of a comparator 120. The A input of the comparator 120 is derived from the output of the counter 110 and represents the current rate of twist of the twister. If the rate of twist differs from the most significant two decimal digits of the contents of the memory 118 that are then present on the bus 119, the comparator 120 energizes one of a pair of AND-gates 122 to cause the counter 110 to count either up or down at an appropriate rate until the contents of the counter 110 equals the first or most significant two decimal digits stored in the memory 118.

The rate at which the contents of the counter 110 is varied is limited by the ability of the twister motor 42 to change its speed. Therefore, the pulses from the AND-gates 122 are controlled by a separate rate multiplier 124 that divides a signal from a clock 125 by a manually-controlled amount so as not to overload the motor by a precipitous change in speed. When the contents of the counter 110 equals the first two digits stored in the memory 118, an inverter 126 removes a constant energization from the AND-gates 122 to prevent further change of the counter 110. Assuming a constant frequency of output from the clock 125, the speed of response of the counter 110 is manually determined by the rate multiplier that is controlled by a thumb switch input 128 which is physically quite similar to the switch input 76 of FIG. 1.

The rate of twist is then ultimately controlled by the two most significant digits of the counter 114 which are stored in the memory 118 whenever a set pulse is applied to the memory 118. Therefore, in order to assure randomness to the number that is set into the memory 118, the set signal applied to the memory 118 to trigger the storage of the contents of the counter 114 must arrive at substantially a random interval. This randomness is accomplished by a down counter 130.

Each time that the memory 118 is set to the count then present in the counter 114, the previous two least-significant-decimal digits of the prior contents of the memory 118 are set into the down counter 130. The down counter 130 receives count pulses at regular intervals until it reaches a count of zero, at which time it issues a zero coincidence signal. The zero coincidence signal resets the down counter 130 to the contents of the two least significant decimal digits of the memory 118 and also triggers the set of the memory 118.

The regular intervals of the count pulses delivered to the counter 130 are derived from a one-KHz source 131 which is passed through a rate multiplier or variable divider 132 to develop a binary "1" trigger pulse every one-to-nine seconds dependent upon the input received from a manual divisor input 134.

Therefore, after a delay determined by the contents of the least significant digits of the memory 118 and the manual input to the divider 132, the memory 118 is set to whatever count is present at the counter 114. The most significant digits of the memory 118 then determine the next twist rate of the twister. The twister responds to the new twist rate at a response speed determined by the manual input 128.

Although a particular embodiment of the invention is shown in the drawings and has been described in the foregoing specification, it is to be understood that other modifications of this invention, varied to fit particular operating conditions will be apparent to those skilled in the art; and the invention is not to be considered limited to the embodiment chosen for purposes of disclosure, and covers all changes and modifications which do not constitute departures from the true scope of the invention.

What is claimed is:

1. A method for controlling the twist length of a pair of twisted wires wherein one wire is wrapped around the other wire while the twisted pair is pulled by a capstan and having means for driving the wrapping means and means for pulling the twisted pair, a means for maintaining a speed ratio between the pulling means and the wrapping means characterized by:
- generating a series of pulses having a frequency representative of the linear travel of the twisted pair;
- electronically altering the frequency of the pulses generated; and
- driving the wrapping means at a rotational speed proportional to the altered frequency of the pulses.

2. A method according to claim 1 including manually controlling the proportionality between the pulses generated responsive to the linear speed of the twisted pair and the speed of rotation of the wrapping means.

3. A method according to claim 1 including randomly varying the proportionality between the pulses generated responsive to linear speed of the twisted pair and the speed of rotation of the wrapping means.

4. In an apparatus for twisting two wires to form a twisted pair having a capstan with a rotational speed representative of the linear speed of the twisted pair;
- means for twisting the wires at an angular speed;
- means responsive to the linear speed of the twisted pair for generating a series of pulses having a frequency proportional to the linear speed of the twisted pair;
- means responsive to the frequency of the pulses for driving the twisting means at a speed proportional to the frequency of the pulses, and
- means for varying the ratio between the frequency of the pulses generated and the speed of the twisting means.

5. An apparatus according to claim 4 wherein the varying means comprises a frequency divider; and
- means for manually varying the divisor of the frequency divider.

6. An apparatus according to claim 4 wherein the varying means comprises a frequency divider having the divisor controllable in response to a code input and means for applying to the frequency divider as its code input a series of random numbers.

7. An apparatus according to claim 6 wherein the applying means comprises:
- a first counter having at least two portions, a most significant portion and a least significant portion;
- means for advancing the first counter at a regular rate;
- means responsive to the least significant portion of the contents of the first counter for sampling the contents of the first counter at random intervals; and
- means responsive to the sampling means for storing the contents of the first counter at said random intervals.

8. An apparatus according to claim 7 wherein the sampling means comprises:
- a second counter for storing the least significant portion of the prior contents of the storing means each time the contents of the first counter is stored in the storing means;
- means for decrementing the contents of the second counter at regular intervals different than the regular rate for advancing the first counter; and
- means responsive to a zero contents of the second counter for issuing a sampling signal to the storing means.

9. An apparatus according to claim 7 further including means for recognizing when the first counter has achieved a maximum permissible count and in response thereto for resetting the first counter to a minimum count from which the first counter is to count toward the maximum permissible count.

10. An apparatus according to claim 9 wherein the the recognizing and resetting means comprises:
- means for generating a signal representative of the maximum count that the first counter is to achieve;
- means for generating a signal representative of the minimum count from which the first counter is to begin counting;
- a comparator for comparing the contents of the first counter with the signal from the maximum generating means; and;
- means responsive to recognition by the comparator of coincidence between the contents of the first counter and the signal from the maximum generating means for setting the first counter to the signal from the minimum generating means.

* * * * *